C. G. LILLOS.
AIR PUMP.
APPLICATION FILED AUG. 25, 1919.
1,351,176. Patented Aug. 31, 1920.
2 SHEETS—SHEET 1.
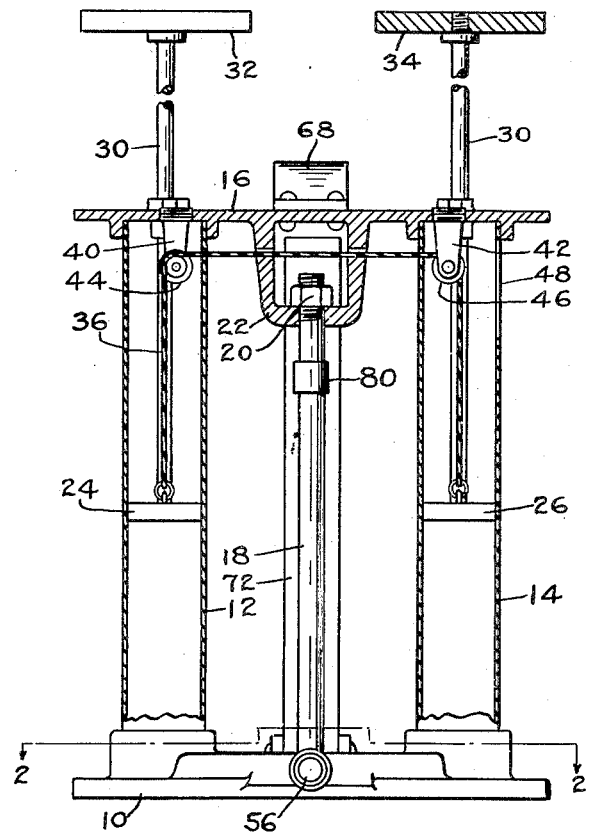
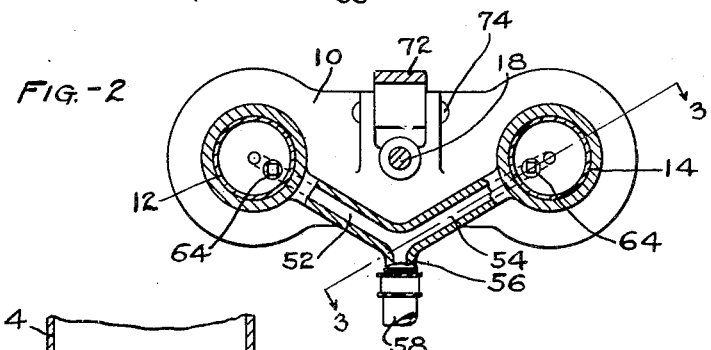
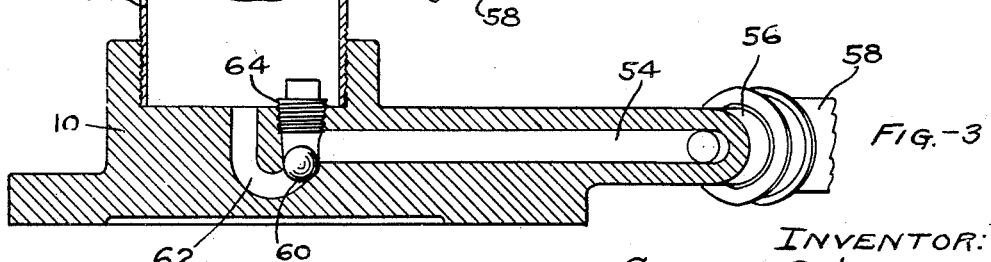
INVENTOR:
CHARLES G. LILLOS.
BY Whiteley and Ruckman
ATTORNEYS.

C. G. LILLOS.
AIR PUMP.
APPLICATION FILED AUG. 25, 1919.
1,351,176.
Patented Aug. 31, 1920.
2 SHEETS—SHEET 2.
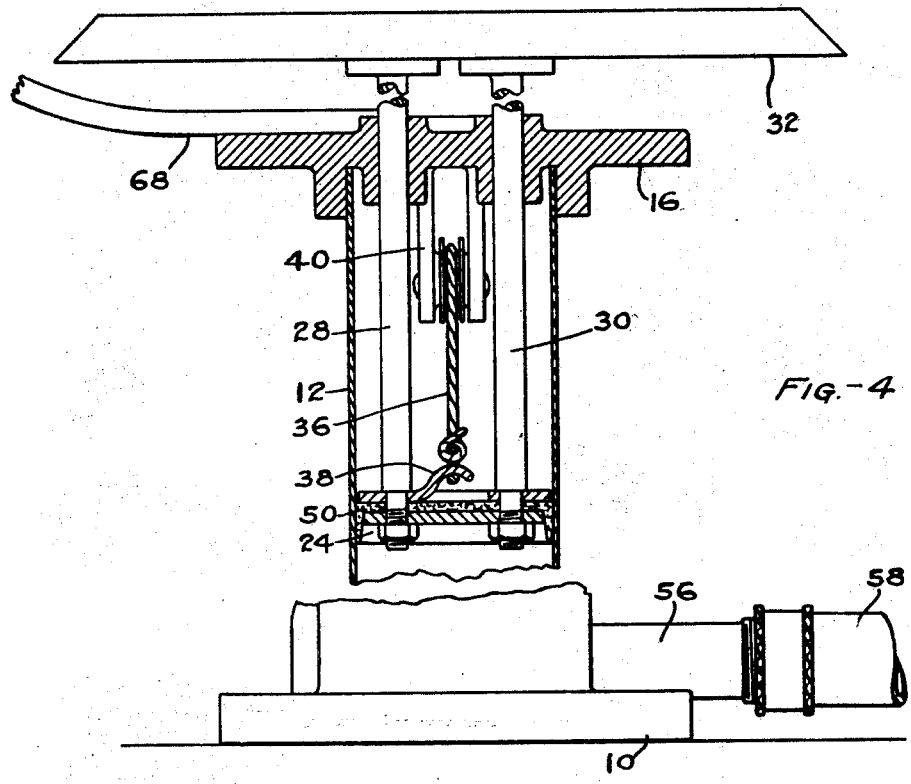
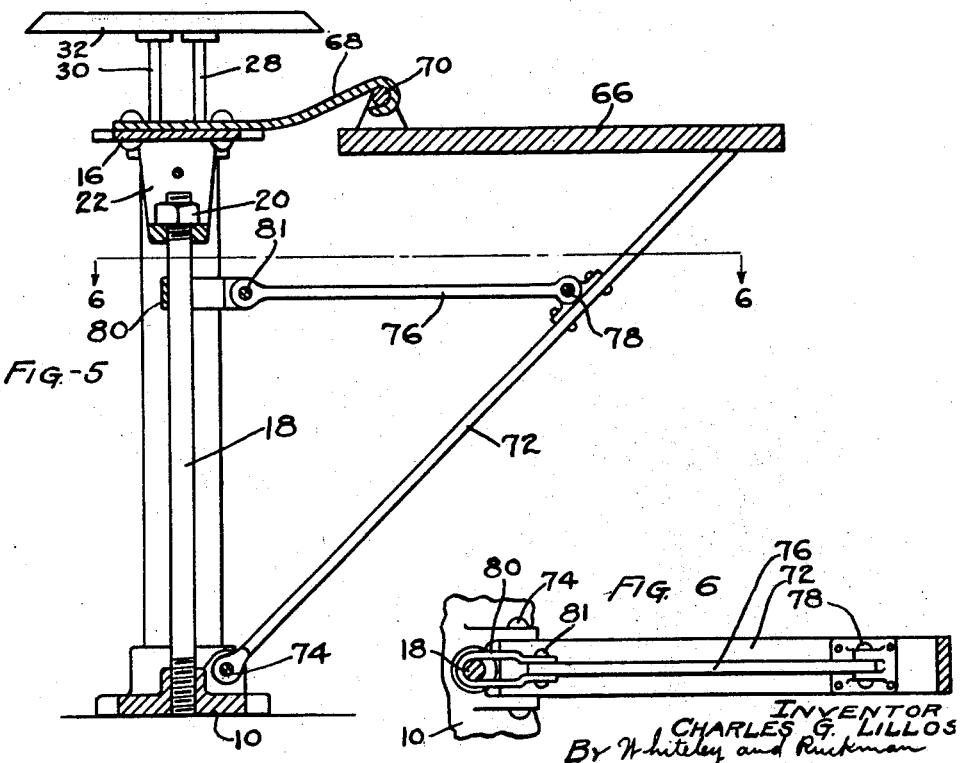
INVENTOR
CHARLES G. LILLOS
By Whiteley and Ruckman
ATTORNEYS

UNITED STATES PATENT OFFICE.

CHARLES G. LILLOS, OF MINNEAPOLIS, MINNESOTA.

AIR-PUMP.

1,351,176.

Specification of Letters Patent. Patented Aug. 31, 1920.

Application filed August 25, 1919. Serial No. 319,777.

*To all whom it may concern:*

Be it known that I, CHARLES G. LILLOS, a citizen of the United States, residing at Minneapolis, in the county of Hennepin and State of Minnesota, have invented certain new and useful Improvements in Air-Pumps, of which the following is a specification.

My invention relates to air pumps and particularly to air pumps intended for inflating tires of automobiles. An object is to provide a device of this kind which will be efficient in operation and which will occupy only a small space when not in use, so that it can be carried along in the automobile and used while traveling on the road. Another object is to provide a pump which may be firmly supported by some part of the automobile when used for inflating the tires.

The full objects and advantages of my invention will appear in connection with the detailed description thereof and the novel features embodied in my inventive idea will be particularly pointed out in the claims.

In the accompanying drawings which illustrate the application of my invention in one form,—

Figure 1 is a view partly in side elevation and partly in vertical section. Fig. 2 is a view in horizontal section on the line 2—2 of Fig. 1. Fig. 3 is a view in section on the line 3—3 of Fig. 2, looking in the direction of the arrows. Fig. 4 is an enlarged, detailed view showing one of the cylinders in section. Fig. 5 is a view of the device mostly in section showing means for attaching it to the running board of an automobile. Fig. 6 is a view in horizontal section on the line 6—6 of Fig. 5.

Referring to the particular construction shown in the drawings, 10 designates a base upon which are mounted a pair of cylinders 12 and 14, the lower ends of which for convenience, may be screw threaded into the base as shown in Fig. 3. A plate 16 is secured over the tops of the cylinders by means of a rod 18 screw-threaded into the base at its lower end and at its upper end secured by means of a nut 20 to a lug 22 which depends from the plate 16. The cylinders 12 and 14 are respectively provided with plungers 24 and 26, each of which is secured to the lower ends of pairs of rods 28 and 30 which extend through the plate 16. Foot-plates 32 and 34 are secured to the upper ends of each pair of rods 28 and 30. A cable or chain 36 has rings fastened to both of its ends and these rings are adapted to be attached to hooks 38 secured upon the upper sides of each of the plungers 24 and 26. The intermediate portion of the cable is supported in the following manner. Brackets 40 and 42 are screw threaded into the plate 16 from the lower side thereof and rollers 44 and 46 are rotatably mounted in these brackets. The cable extends over these pulleys and is of such length that it will be taut when both plungers are substantially midway in the cylinders as shown in Fig. 1. It is evident, therefore, that when one plunger is depressed to the bottom of its cylinder, the other plunger will be raised by the cable to the top of its cylinder and vice versa. The cylinders are provided with openings 48 at their upper ends which not only allow air to flow into the cylinders above the plungers when the latter are depressed, but provide for reaching and unhooking the end of the cable when one of the plungers is at the top of its cylinder in order that both foot-plates may be depressed to make the device more compact when not in use. In operation, when a plunger is lifted, the air flows past the packing 50 in the usual way and fills the space in the cylinder below the plunger. From the bottoms of the cylinders, air passages 52 and 54 lead to a discharge nozzle 56 to which is attached the customary hose 58 for inflating the tires. A check-valve 60 is provided for each of the air passages 52 and 54, these check-valves having valve seats formed at the ends of reduced gooseneck portions 62 of the passages at the place where they lead from the bottoms of the cylinders. In order to place the valves 60 in position, the bottoms of the cylinders are provided with screw plugs 64 which when removed, permit insertion of the valves.

In order to hold the pump firmly in place while inflating the tires, provision is made for attaching the pump to the running board 66 as follows:

To the top plate of the pump is secured a hooked member 68 adapted to be hooked upon an engaging member 70 secured to the running board. A brace bar 72 is hinged to the base at 74 and intermediate the ends of this brace bar, a link 76 is pivoted to the bar at 78. The other end of the link is slidably connected to the rod 18 by a loop member 80 pivoted to the link at 81. The brace bar 72 engages the under side of the running board and in connection with the hooked members 68 serves to hold the pump securely in place while it is being operated. When the hooked member is disengaged, the loop member 80 may be slid to the bottom of the rod 18 so that the bar 72 and the link 76 fold closely against the pump.

The operation and advantages of my invention will be readily understood from the foregoing description. The pump is supported in proper position in suitable manner as by attaching it to the running board of an automobile in the manner already described. The cable being attached at its ends to the plungers, the operator stands upon the foot-plates 32 and 34 and by alternately balancing himself first upon one foot-plate and then upon the other, forces air alternately from the two cylinders through the hose for inflating purposes.

I claim:

1. An air pump comprising a base, a pair of cylinders secured to said base, a plate fitting the tops of said cylinders, a lug depending from the middle of said plate, a rod secured to said base and to said lug, plungers in said cylinders, a pair of rods extending up from each of said plungers, foot-plates secured to the upper ends of each pair of rods, rollers mounted at the tops of said cylinders, and a cable running over said rollers and attached at its ends to said plungers.

2. An air pump comprising a base, a pair of cylinders secured to said base, a plate fitting the tops of said cylinders, a rod extending between said cylinders vertically and secured to said base and to said plate, a hooked member secured to said plate, a brace bar pivoted to said base, a loop member slidable on said rod, a link pivoted at one end to said brace rod and pivoted at its other end to said loop member, plungers in said cylinder, rods extending up from said plungers and foot-plates secured to the upper ends of said rods.

In testimony whereof I hereunto affix my signature.

CHARLES G. LILLOS.